US008515720B2

(12) United States Patent
Koutsabeloulis et al.

(10) Patent No.: US 8,515,720 B2
(45) Date of Patent: Aug. 20, 2013

(54) DETERMINE FIELD FRACTURES USING GEOMECHANICAL FORWARD MODELING

(75) Inventors: Nikolaos Constantinos Koutsabeloulis, Winkfield-Windsor (GB); Gui Fen Xi, Bracknell (GB); Qinglai Ni, Bracknell (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 602 days.

(21) Appl. No.: 12/755,114

(22) Filed: Apr. 6, 2010

(65) Prior Publication Data

US 2011/0246154 A1    Oct. 6, 2011

(51) Int. Cl.
*G06G 7/48* (2006.01)

(52) U.S. Cl.
USPC .......................................... 703/10

(58) Field of Classification Search
USPC .......................................... 703/10
See application file for complete search history.

(56) References Cited

U.S. PATENT DOCUMENTS

| | | | | |
|---|---|---|---|---|
| 7,043,410 | B2 * | 5/2006 | Malthe-Sorenssen et al. | ... 703/2 |
| 7,254,091 | B1 * | 8/2007 | Gunning et al. | 367/73 |
| 8,184,502 | B2 * | 5/2012 | Xu et al. | 367/38 |
| 2002/0013687 | A1 * | 1/2002 | Ortoleva | 703/10 |
| 2011/0120702 | A1 * | 5/2011 | Craig | 166/250.1 |
| 2011/0125471 | A1 * | 5/2011 | Craig et al. | 703/6 |

FOREIGN PATENT DOCUMENTS

WO    0175588 A1    10/2001

OTHER PUBLICATIONS

Macé et al., Integration of fracture data into 3d geomechanical modeling to enhance fractured reservoirs characterization, Oct. 9-12, 2005, SPE Annual Technical Conference and Exhibition, Dallas, Texas, ISBN 978-1-55563-150-5, pp. 1-9.*
Garcia et al., Fast and efficient modeling and conditioning of naturally fractured reservoir models using static and dynamic data, Jun. 11-14, 2007, EUROPEC/EAGE Conference and Exhibition, London, ISBN 978-1-55563-228-1, pp. 1-20.*
GB1105552.2—Combined Search and Examination Report under Sections 17 and 18(3) dated Jul. 21, 2011.

* cited by examiner

*Primary Examiner* — Kamini S Shah
*Assistant Examiner* — Juan Ochoa
(74) *Attorney, Agent, or Firm* — Colin Wier; Rodney Warfford

(57) ABSTRACT

A method for fracture modeling of a field. The method includes receiving, using a central processing unit (CPU), a structural model of the field, the structural model comprising field data, restoring each of a plurality of geological layers from the structural model to create a plurality of boundary conditions, iteratively forward modeling each of the plurality of geological layers, defined by one of the plurality of boundary conditions, using geomechanical properties by and redetermining the fractures resulting from the internal stress and the internal strain for each previously processed geological layer of the plurality of geological layers using the geomechanical properties, when each of the plurality of layers is forward modeled, generating, using the CPU and geostatistical modeling, a fracture model with the fractures resulting from the internal stress and the internal strain of the plurality of layers, and presenting the fracture model for use in planning a field operation.

20 Claims, 9 Drawing Sheets

DETERMINE FIELD FRACTURES USING GEOMECHANICAL FORWARD MODELING

BACKGROUND

Field operations, such as surveying, drilling, wireline testing, completions, production, planning, and oilfield analysis, are typically performed to locate and gather valuable downhole fluids, gases, and/or solid materials. During the field operations, data is typically collected for analysis and/or monitoring of the field operations. Such data may include, for example, subterranean formation, equipment, historical, and/or other data. Data concerning the subterranean formation is collected using a variety of sources. Such formation data may be static or dynamic. Static data relates to, for example, formation structure and geological stratigraphy that define the geological structures of the subterranean formation. Dynamic data relates to, for example, fluids flowing through the geologic structures of the subterranean formation over time. Such static and/or dynamic data may be collected to learn more about the formations and the valuable assets contained therein.

The data may be used to predict downhole conditions and make decisions concerning field operations. Such decisions may involve well planning, well targeting, well completions, operating levels, production rates and other operations and/or operating parameters. There are usually a large number of variables and large quantities of data to consider in analyzing field operations. It is, therefore, often useful to model the behavior of the field operation to determine the desired course of action. During the ongoing operations, the operating parameters may be adjusted as field conditions change and new information is received. Techniques have been developed to model the behavior of various aspects of field operations, such as geological structures, downhole reservoirs, wellbores, surface facilities, as well as other portions of the field operation.

SUMMARY

In one or more implementations of fracture modeling of a field, a method that includes receiving, using a central processing unit (CPU), a structural model of the field, the structural model comprising field data, and restoring each of a plurality of geological layers from the structural model to create a plurality of boundary conditions. The method further includes iteratively forward modeling each of the plurality of geological layers, defined by one of the plurality of boundary conditions, using geomechanical properties by and redetermining the fractures resulting from the internal stress and the internal strain for each previously processed geological layer of the plurality of geological layers using the geomechanical properties. The method further includes, when each of the plurality of layers is forward modeled, generating, using the CPU and geostatistical modeling, a fracture model with the fractures resulting from the internal stress and the internal strain of the plurality of layers, and presenting the fracture model for use in planning a field operation.

Other aspects of determining field fractures using geomechanical forward modeling will be apparent from the following description and the appended claims.

DETAILED DESCRIPTION

Figure 1:
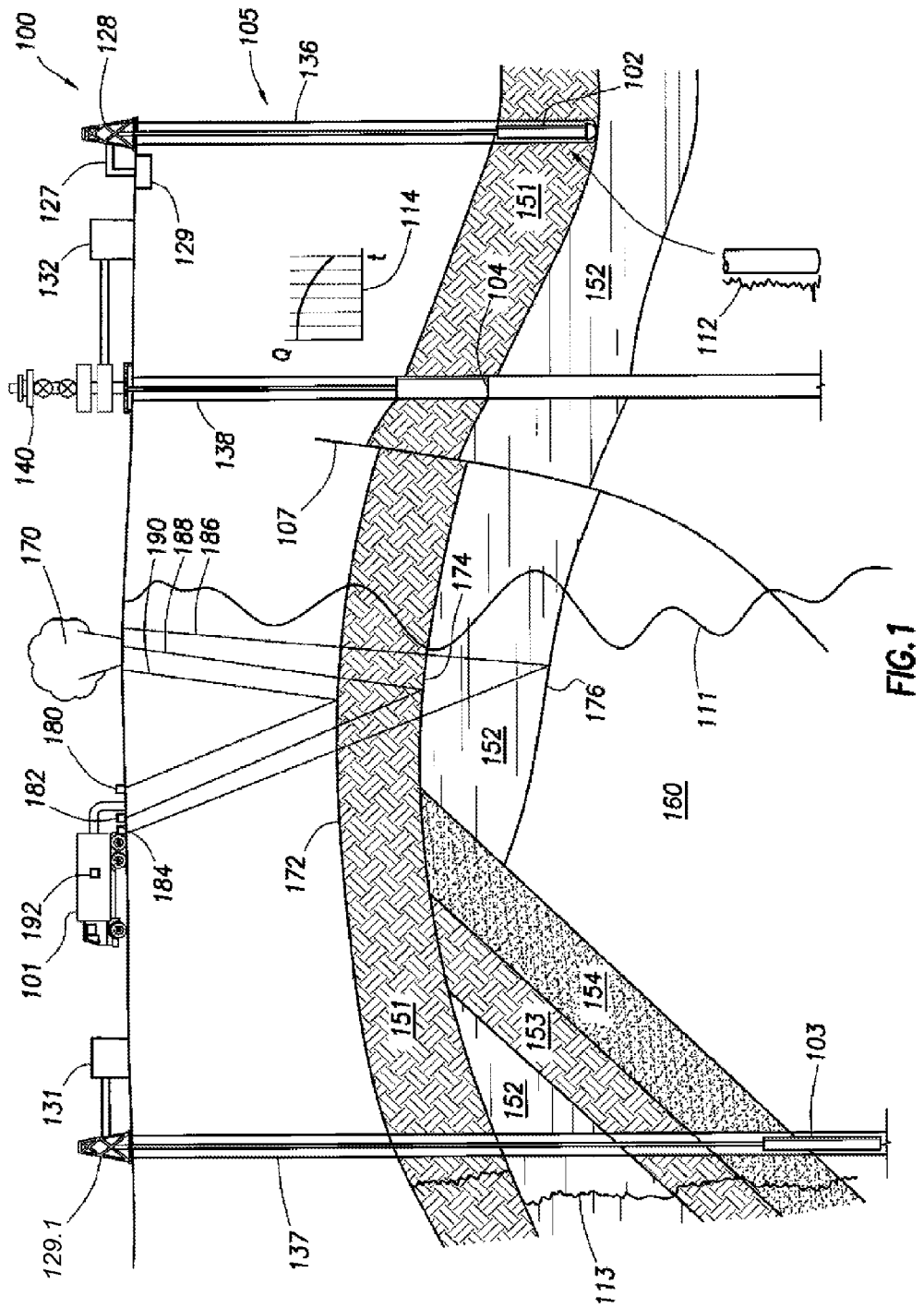
FIG. 1 is a schematic view, partially in cross-section, of a field having a plurality of data acquisition tools positioned at various locations along the field for collecting data from the subterranean formation, in which embodiments of determining field fractures using geomechanical forward modeling may be implemented.

Specific embodiments will now be described in detail with reference to the accompanying figures. In describing the embodiments, like or identical reference numerals are used to identify common or similar elements. The figures are not necessarily to scale and certain features and certain views of the figures may be shown exaggerated in scale or in schematic in the interest of clarity and conciseness.

In the following detailed description of embodiments determining field fractures using geomechanical forward modeling, numerous specific details are set forth in order to provide a more thorough understanding. However, it will be apparent to one of ordinary skill in the art that determining field fractures using geomechanical forward modeling may be practiced without these specific details. In other instances, well-known features have not been described in detail to avoid unnecessarily complicating the description.

In general, embodiments provide for determining field fractures using geomechanical forward modeling. More specifically, one or more embodiments provide a method and system for forward modeling geological layers using geomechanical properties and boundary conditions obtained from a structural restoration to determine fractures in a field. For clarification, a field may include part of a subterranean formation. More specifically, a field as referred to herein may include any underground geological formation containing a resource that may be extracted. Part, or all, of a field may be on land, water, and/or sea. Also, while a single field measured at a single location is described below, any combination of one or more fields, one or more processing facilities, and one or more wellsites may be utilized. The resource may include, but is not limited to, hydrocarbons (oil and/or gas), water, helium, and minerals. A field may include one or more reservoirs, which may each contain one or more resources.

In one or more embodiments, geostatistical modeling describes properties in the field that change over time and/or space. An example of an input to a geostatistical model is a log chart produced by a logging device. In one or more embodiments, geomechanical properties describe properties of the reservoir and surrounding subterranean formation of the field. Examples of geomechanical properties include, but are not limited to, formation stress, formation strain, pore pressure, and fluid flow.

FIG. 1 is a schematic view, partially in cross section, of a field 100 having data acquisition tools (e.g., seismic truck 101, drilling tool 102, wireline tool 103, and production tool 104) positioned at various locations along the field 100 for collecting data of the subterranean formation 105. Seismic truck 101 represents a survey tool that is adapted to measure properties of the subterranean formation. The survey operation is a seismic survey operation for producing sound vibrations. One such sound vibration (e.g., 186, 188, 190) generated by a source 170 reflects off a plurality of horizons (e.g., 172, 174, 176) in the subterranean formation 105. Each of the sound vibrations (e.g., 186, 188, 190) are received by one or more sensors (e.g., 180, 182, 184), such as geophone-receivers, situated on the earth's surface. The geophones produce electrical output signals, which may be transmitted, for example, as input data to a computer 192 on the seismic truck 101. Responsive to the input data, the computer 192 may generate a seismic data output.

The drilling tool 102 may be suspended by a rig 128 and advanced into the subterranean formation 105 to form a wellbore 136. A mud pit 129 is used to draw drilling mud into the drilling tool 102 via a flow line 127 for circulating drilling mud through the drilling tool 102, up the wellbore 136 and back to the surface. The drilling mud is usually filtered and returned to the mud pit 129. A circulating system may be used for storing, controlling, or filtering the flowing drilling muds. The drilling tool 102 is advanced into the subterranean formation to reach a reservoir 160. Each well may target one or more reservoirs 160. The drilling tool 102 is adapted for measuring downhole properties using logging while drilling (LWD) tools, measurement while drilling (MWD) tools, or any other suitable measuring tool. The LWD tool and/or MWD tool may also be adapted for taking a core sample, or removed so that a core sample may be taken using another tool.

Wireline tool 103 may be suspended by a rig 129.1 (which is coupled to surface facilities 131) and into the wellbore 137. The wireline tool 103 is adapted for deployment into a wellbore for generating well logs, performing downhole tests and/or collecting samples. The wireline tool 103 may be used to provide another method and apparatus for performing a seismic survey operation. The wireline tool 103 may, for instance, have an explosive, radioactive, electrical, or acoustic energy source that sends and/or receives electrical signals to the surrounding subterranean formation(s) 105 and fluids therein. Sensors, such as gauges, may be positioned in the wireline tool 103 to measure downhole parameters which relate to, for instance porosity, permeability, fluid composition and/or other parameters of the operation.

The production tool 104, represented in FIG. 1 by a christmas tree 140, is adapted to draw fluid from the downhole reservoir(s) 160, through a completed wellbore 138, and into surface facilities 132. Fluid flows from a reservoir 160 through perforations in the casing (not shown) of the completed wellbore 138 and into the production tool 104 in the wellbore 138 and to the surface facilities 132 via a gathering network. Sensors, such as gauges, may be positioned about the field 100 to collect data relating to various operations as described previously. As shown, the sensor may be positioned in the production tool 104 or associated equipment, such as the gathering network, surface facilities and/or the production facility, to measure fluid parameters, such as fluid composition, flow rates, pressures, temperatures, and/or other parameters of the production operation.

The data acquisition tools (e.g., seismic truck 101, drilling tool 102, wireline tool 103 and production tool 104) may generate data plots and/or measurements. These data plots and/or measurements are depicted along the field 100 to demonstrate the data generated by the various operations.

While only simplified wellsite configurations are shown, it will be appreciated that the field 100 may cover a portion of land, sea, and/or water locations that hosts one or more wellsites. Production may also include injection wells (not shown) for added recovery. One or more gathering facilities may be operatively connected to one or more of the wellsites for selectively collecting downhole fluids from the wellsite(s).

While FIG. 1 depicts data acquisition tools (e.g., seismic truck 101, drilling tool 102, wireline tool 103, and production tool 104) used to measure properties of a field, it will be appreciated that the tools may be used in connection with non-wellsite operations, such as mines, aquifers, storage, or other subterranean facilities. Also, while certain data acquisition tools (e.g., seismic truck 101, drilling tool 102, wireline tool 103 and production tool 104) are depicted, it will be appreciated that various measurement tools capable of sensing parameters, such as seismic two-way travel time, density, resistivity, production rate, etc., of the subterranean formation and/or its geological formations may be used. Various sensors may be located at various positions along the wellbore and/or the monitoring tools to collect and/or monitor the desired data. Other sources of data may also be provided from offsite locations.

Static data plots 111 through 113 are examples of static data plots that may be generated by the seismic truck 101, drilling tool 102, and wireline tool 103, respectively. Static data plot 111 is a seismic two-way response time and may be used to provide data, such as a two-way response over a period of time. Static plot 112 is core sample data measured from a core sample of the formation 105, and may be used to provide data, such as a graph of the density, porosity, permeability or other physical property of the core sample over the length of the core. Tests for density and viscosity may be performed on the fluids in the core at varying pressures and temperatures. Static data plot 113 is a logging trace that may provide data, such as resistivity or other measurement of the formation at various depths. Dynamic data plot 114 is a production decline curve of the fluid flow rate through the subterranean formation over time. Other data may also be collected, such as historical data, user inputs, economic information and/or other measurement data and other parameters of interest.

The static data plots 111 through 113 and dynamic data plot 114 depict examples of static measurements that may describe or provide information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

The subterranean formation 105 has a variety of geological formations (i.e., layers) 151 through 154. As shown, the structure has several formations or layers, including a first shale layer 151, a carbonate layer 152, a second shale layer 153, and a sand layer 154. A fault 107 extends through each of the first shale layer 151 and the carbonate layer 152. The static data acquisition tools (e.g., seismic truck 101, drilling tool 102, and wireline tool 103) are adapted to take measurements and detect characteristics of each of the layers.

While a specific subterranean formation with specific geological structures is depicted, it will be appreciated that the field may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the field, it will be appreciated that one or more types of measurement may be taken at one or more location across one or more fields or other locations for comparison and/or analysis.

The data collected from various sources, such as the data acquisition tools (e.g., seismic truck 101, drilling tool 102, wireline tool 103, and production tool 104) of FIG. 1, may then be processed and/or evaluated. Typically, seismic data displayed in the static data plot 111 from the seismic truck 101 is used by a geophysicist to determine characteristics of the subterranean formations and features. Core data shown in static plot 112 and/or log data from the well log 113 are typically used by a geologist to determine various characteristics of the subterranean formation. Production data from the graph 114 is typically used by the reservoir engineer to determine fluid flow reservoir characteristics. The data analyzed by the geologist, geophysicist and the reservoir engineer may be analyzed using modeling techniques.

Figure 2:
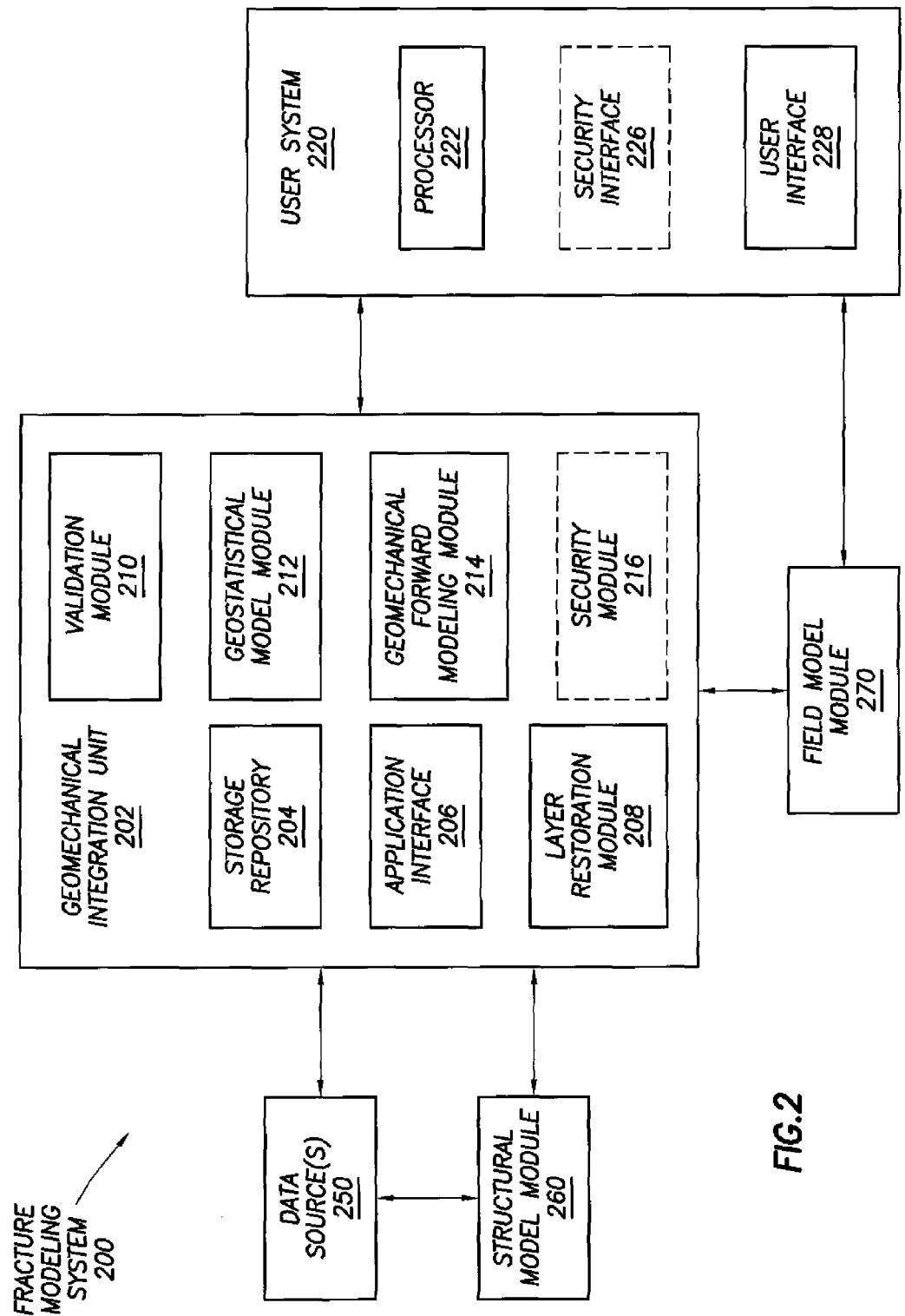
FIG. 2 illustrates an example system in which embodiments of determining field fractures using geomechanical forward modeling may be implemented.

FIG. 2 shows a diagram of a fracture modeling system 200 to determine fractures in a field using forward modeling in accordance with one or more embodiments. The fracture modeling system 200 includes a geomechanical integration unit 202, a user system 220, one or more data sources 250, a structural model module 260, and field model module 270. The geomechanical integration unit 202 includes a storage repository 204, one or more application interfaces 206, a layer restoration module 208, a validation module 210, a geostatistical model module 212, a geomechanical forward modeling module 214, and, optionally, a security module 216. The user system 220 includes a processor 222, a user interface 228, and, optionally, a security interface 226. Each of these components is described below. One of ordinary skill in the art will appreciate that embodiments are not limited to the configuration shown in FIG. 2.

In one or more embodiments, the geomechanical integration unit 202 is configured to interact with one or more data sources 250 using one or more of the application interface(s) 206. The application interface 206 may be configured to receive data (e.g., field data) from a data source 250 and/or store data to the storage repository 204. In addition, the application interface 206 may be configured to receive data from the storage repository 204 and deliver the data to a data source 250. The data source 250 may be one of a variety of sources providing data associated with a field. A data source 250 may include, but is not limited to, a surface unit for collecting data from the field, a computer, a database, a spreadsheet, a user, and a data acquisition tool as described above with respect to FIG. 1. A data source 250 may be configured to provide data to the application interface 206 through an automated process, such as through a web-based application, a direct feed, or some other form of automated process. Optionally, a data source 250 may require manual entry of data by a user through a user system 220 using the application interface 206.

In one or more embodiments, the geomechanical integration unit 202 is configured to interact with the structural model module 260 using one or more of the application interfaces 206. The application interface 206 may be configured to receive data (e.g., model output) from the structural model module 260 and/or store the data to the storage repository 204. In addition, the application interface 206 may be configured to receive data from the storage repository 204 and deliver the data to the structural model module 260. The structural model module 260 may use data, received from the geomechanical integration unit 202 and/or one or more data sources 250, to generate a structural model of a field. The structural model of the field produced by the structural model module 260 may be in two or three dimensions. In one or more embodiments, the structural model is used to mathematically model (e.g., using a simulation system) geological bodies within a subterranean formation. The structural model may describe the characteristics of the boundary layer between rock volumes with different properties or between solid earth and the atmosphere or the hydrosphere. The structural model may also describe the lithology of deposits to a depth that is small relative to the horizontal extent of the model, or may relate to surface morphology, age (as opposed to deposit age), or depositional environment. The surfaces in the structural model may represent boundaries of volumes. The output of a structural model may be used to understand a subterranean formation. The structural model module 260 may be a device internal to the geomechanical integration unit 202. Alternatively, the structural model module 260 may be an external device operatively connected to the geomechanical integration unit 202. The structural model module 260 may be configured to provide data to the application interface 206 through an automated process, such as through a web-based application, a direct feed, or some other form of automated process. Optionally, the structural model module 260 may require manual entry of data by a user through the user system 220 using the application interface 206.

In one or more embodiments, the geomechanical integration unit 202 is configured to interact with the field model module 270 using one or more of the application interfaces 206. The application interface 206 may be configured to receive data (e.g., model output) from the field model module 270 and/or store the data to the storage repository 204. In addition, the application interface 206 may be configured to receive data from the storage repository 204 and deliver the data to the field model module 270. The field model module 270 may use data, received from the geomechanical integration unit 202, to generate an operating plan for a field based on the output of the geostatistical model module 212, as described below. The field model module 270 may be a device internal to the geomechanical integration unit 202. Alternatively, the field model module 270 may be an external device operatively connected to the geomechanical integration unit 202. The field model module 270 may be configured to provide data to the application interface 206 through an automated process, such as through a web-based application, a direct feed, or some other form of automated process. Optionally, the field model module 270 may require manual entry of data by a user through the user system 220 using the application interface 206. The field model module 270 may also be configured to send data (e.g., model output) directly to the user system 220.

In one or more embodiments, the processor (i.e., central processing unit (CPU)) 222 of the user system 220 is configured to execute instructions to operate the components of the user system 220 (e.g., the user interface 228, and, optionally, the security interface 226).

In one or more embodiments, the user system 220 is configured to interact with a user using the user interface 228. The user interface 228 may be configured to receive data and/or instruction(s) from the user. The user interface 228 may also be configured to deliver instruction(s) to the user. In addition, the user interface 228 may be configured to send data and/or instruction(s) to, and receive data and/or instruction(s) from, the geomechanical integration unit 202 and/or the field model module 270. The user may include, but is not limited to, an individual, a group, an organization, or some other legal entity. The user system 220 may be, or may contain a form of, an internet-based communication device that is capable of communicating with the application interface 206 of the geomechanical integration unit 202. Alternatively, the geomechanical integration unit 202 may be part of the user system 220. The user system 220 may correspond to, but is not limited to, a desktop computer with internet access, a laptop computer with internet access, a smart phone, and a personal digital assistant (PDA), or other user accessible device.

In one or more embodiments, the user system 220 may optionally include a security interface 226. The security interface 226 may be configured to ensure that a user has authority to access the user system 220, the field model module 270, and/or the geomechanical integration unit 202. More specifically, the security interface 226 may be configured to authenticate the user based on security keys verifying the identity user. Authentication of the user may be required before the user is given access to the user system 220. Authenticating the user may occur in a variety of ways, including but not limited to a personal identification number, voice recognition, a password, biometric authentication, any other suitable authentication mechanism, or any combination thereof. The security interface 226 may further be configured to restrict access of a user to the user system 220. For example, a user, once authenticated, may only have access to the geomechanical integration unit 202 and not the field model module 270.

As shown, communication links are provided between the geomechanical integration unit 202 and the user system 220, the data source(s) 250, the structural model module 260, and the field model module 270. A communication link is also provided between the data source(s) 250 and the structural model module 260, and between the user system 220 and the field model module 270. A variety of links may be provided to facilitate the flow of data through the fracture modeling system 200. For example, the communication links may provide for continuous, intermittent, one-way, two-way, and/or selective communication throughout the fracture modeling system 200. The communication links may be of any type, including but not limited to wired and wireless.

In one or more embodiments, a central processing unit (CPU, not shown) of the geomechanical integration unit 202 is configured to execute instructions to operate the components of the geomechanical integration unit 202 (e.g., storage respository 204, the application interface 206, the layer restoration module 208, the validation module 210, the geostatistical model module 212, the geomechanical forward modeling module 214, and, optionally, the security module 216). In one or more embodiments, the memory (not shown) of the geomechanical integration unit 202 is configured to store software instructions for using forward modeling to determine fractures in a field. The memory may be one of a variety of memory devices, including but not limited to random access memory (RAM), read-only memory (ROM), cache memory, and flash memory. The memory may be further configured to serve as back-up storage for information stored in the storage repository 204.

In one or more embodiments, the geomechanical integration unit 202 is configured to obtain and store field data in the storage repository 204. In one or more embodiments, the storage repository 204 is a persistent storage device (or set of devices) and is configured to receive field data from a data source(s) 250, the structural model module 260, the field model module 270, and/or from a user system 220 using the application interface 206. The storage repository 204 is also configured to deliver field data to, and receive field data from, the layer restoration module 208, the validation module 210, the geostatistical model module 212, and/or the geomechanical forward modeling module 214. The storage repository 204 may be a data store (e.g., a database, a file system, one or more data structures configured in a memory, an extensible markup language (XML) file, some other medium for storing data, or any suitable combination thereof), which may include information (e.g., historical data, user information, field location information) related to the collection of field data for a field. The storage repository 204 may be a device internal to the geomechanical integration unit 202. Alternatively, the storage repository 204 may be an external storage device operatively connected to the geomechanical integration unit 202.

In one or more embodiments, the geomechanical integration unit 202 is configured to interact with the user system 220 using the application interface 206. The application interface 206 may be configured to receive data and/or instruction(s) from the user system 220. The application interface 206 may also be configured to deliver instruction(s) to the user system 220. In addition, the application interface 206 may be configured to send data and/or instruction(s) to, and receive data and/or instruction(s) from, the storage repository 204, the layer restoration module 208, the validation module 210, the geostatistical model module 212, and/or the geomechanical forward modeling module 214.

In one or more embodiments, the data transferred between the application interface 206 and the data source 250, the structural model module 260, the field model module 270, and/or the user system 220 corresponds to field data, fractures, stresses and strains, and/or various models of the field. In one or more embodiments, the geomechanical integration unit 202 is configured to support various data formats provided by the data source(s) 250, the structural model module 260, the field model module 270, and/or the user system 220.

In one or more embodiments, the geomechanical integration unit 202 is configured to perform a structural evolution analysis of a model of a field using the layer restoration module 208. The layer restoration module 208 may be configured to receive a model or data from the application interface 206 and restore each layer of the model. Specifically, the layer restoration module 208 may receive a structural model of the field (as generated by the structural model module 260) from the application interface 206. The layer restoration module 208 may also be configured to receive any other model of the field, in two or three dimensions. The layers restored by the layer restoration module 208 may be geological layers, which may differentiated by geologic age, formation type, or some other suitable differentiation of layers in the field. In one or more embodiments, the layers of greater geological age are located further away from the surface than layers of lesser geological age.

In one or more embodiments, the geomechanical integration unit 202 is configured to validate the output of the structural model module 260 using the validation module 210. The validation module 210 may be configured to validate the output of the structural model module 260 in a number of ways. For example, the validation module 210 may compare the amount of rock in the field before deformation with the amount of rock in the field after deformation to determine if the amounts are equal. If the amounts are not equal, then the output of the structural model module 260 is not valid. If the validation module 210 determines that the output of the structural model module 260 is not valid, then the validation module 210 may require the structural model module 260 to re-run the model to generate a new output. If the validation module 210 determines that the output of the structural model module 260 is valid, then the validation module 210 may notify the layer deconstruction module 208 that the output of the structural model module 260 is available for use.

In one or more embodiments, the geomechanical integration unit 202 is configured to forward model the restored layers from the layer restoration module 208 using the geomechanical forward modeling module 214. The geomechanical forward modeling module 214 may be configured to use geomechanical properties to forward model the restored layers from the layer restoration module 208. In one or more embodiments, each layer of the field is forward modeled from the oldest in geological age to the newest in geological age. After each layer is forward modeled, the geomechanical forward modeling module 214 determines an internal stress and an internal strain for that particular layer. Based on the internal stress and internal strain of a layer, one or more fractures are determined for that particular layer. As subsequent (i.e., more recent in geological time) layers are forward modeled, the internal stress and internal strain of each of the previously modeled (i.e., older) layers are reevaluated, based on each subsequent layer, to determine if the one or more fractures for that particular previous layer have changed. In one or more embodiments, the geomechanical forward modeling module 214 may evaluate all layers in the field or only a select number of layers in the field. The layers evaluated by the geomechanical forward modeling module 214 may be consecutive.

In one or more embodiments, the geomechanical integration unit 202 is configured to determine fractures in a field using the geostatistical model module 212. The geostatistical model module 212 may be configured to conduct fracture simulations based on the output of the geomechanical forward modeling module 214 using geostatistical modeling. Specifically, the geostatistical model module 212 may use the origin of the fractures, as determined by the geomechanical forward modeling module 214, to predict the magnitude and orientation of the fractures based on a structural event. The output of the geostatistical model module 212 may be sent to the user system 220 and/or the field model module 270 to help generate a plan for a field operation.

Optionally, in one or more embodiments, the security module 216 is configured to secure interactions between the application interface 206 and one or more of the data source 250, the structural model module 260, the field model module 270, and the user system 220. More specifically, the security module 216 may be configured to authenticate communication from the applications based on security keys verifying the identity of the source of the communication. For example, a user system 220 may be associated with a security key enabling the user system 220 to interact with the geomechanical integration unit 202. Further, the security module 216 may be configured to restrict requests for information, including but not limited to field data and fractures determined from forward modeling. For example, the user system 220 may be restricted to receive a read-only version of the fractures in the field.

The geomechanical integration unit 202 may include one or more system computers, which may be implemented as a server or any conventional computing system However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the geomechanical integration unit 202, it will be appreciated that a variety of components with various functions may be used to provide the formatting, processing, utility and coordination functions necessary to modify a magnified field model in the geomechanical integration unit 202. The components may have combined functionalities and may be implemented as software, hardware, firmware, or combinations thereof.

Figure 3:
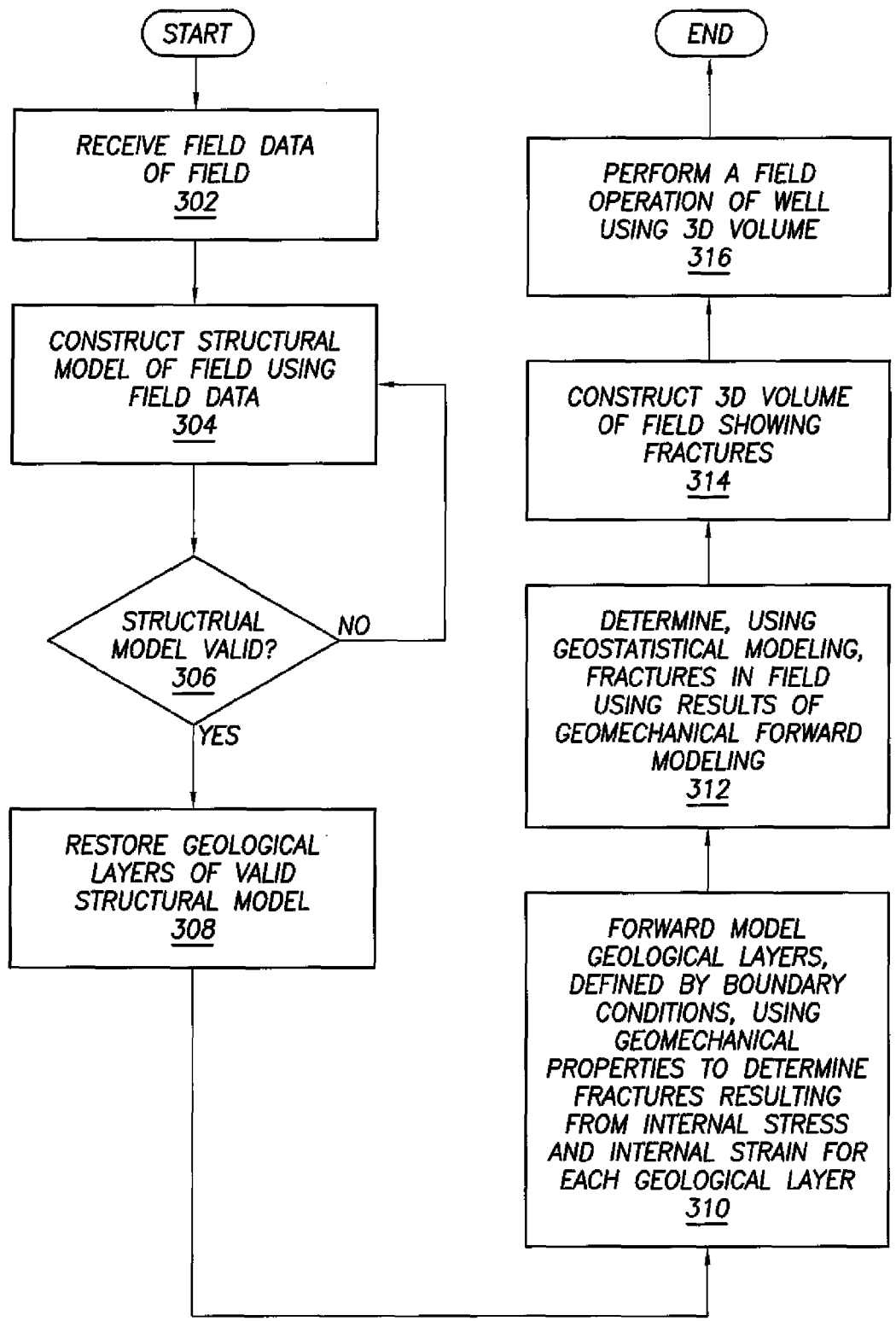
FIGS. 3 and 4 each illustrate an example method for determining field fractures using geomechanical forward modeling in accordance with one or more embodiments.
Figure 4:
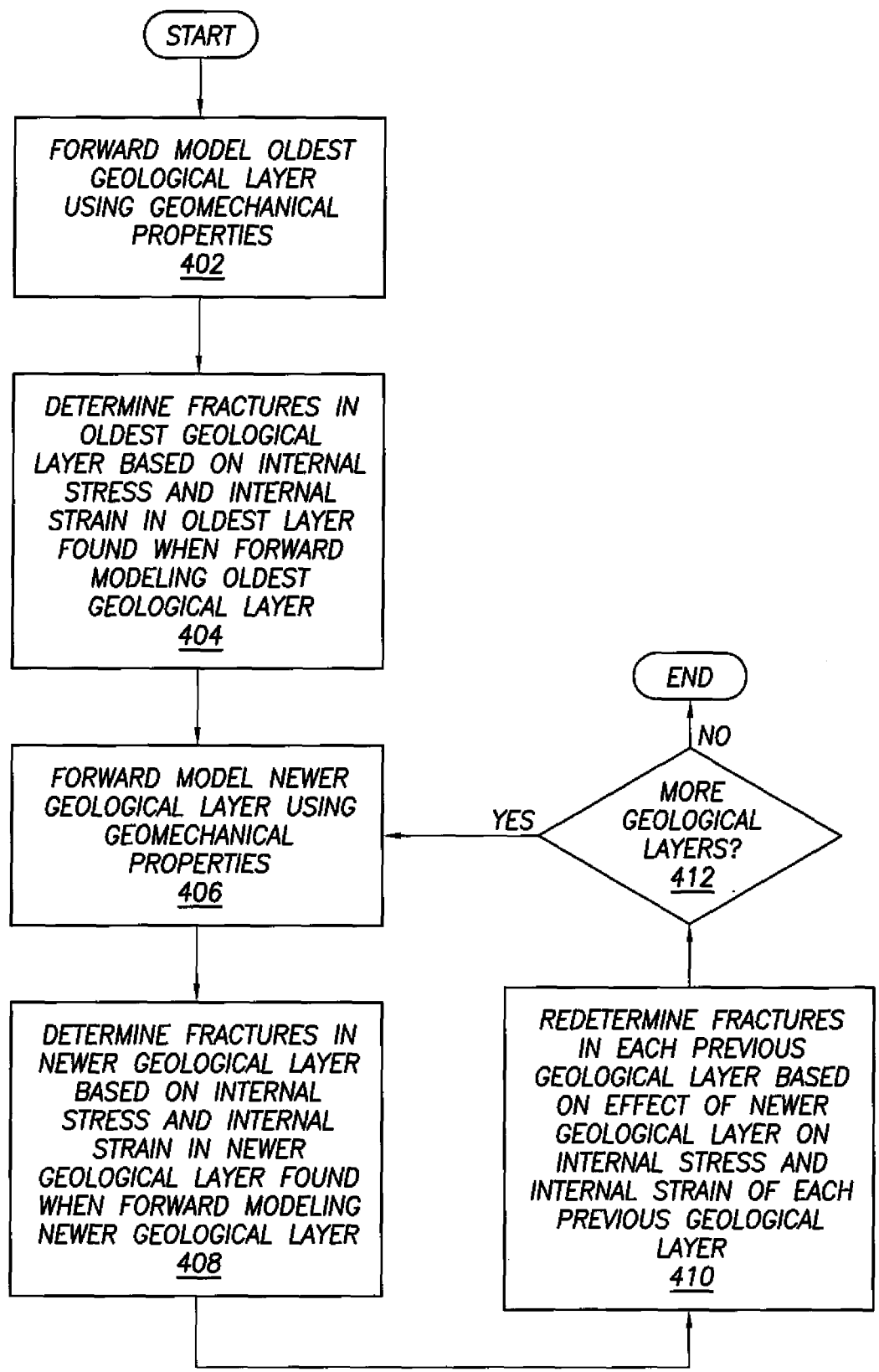

FIGS. 3 and 4 shows a flowchart of a method for determining field fractures using geomechanical forward modeling in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments, one or more of the steps described below may be omitted, repeated, and/or performed in a different order. In addition, a person of ordinary skill in the art will appreciate that additional steps, omitted in FIGS. 3 and 4, may be included in performing this method. Accordingly, the specific arrangement of steps shown in FIGS. 3 and 4 should not be construed as limiting the scope of determining field fractures using geomechanical forward modeling. In one or more embodiments, a particular computing device, as described, for example, in FIG. 9 below, may be used to perform the function described in each of the elements described below with respect to FIGS. 3 and 4.

Referring to FIG. 3, in element 302, field data of the field is received. In one or more embodiments, the field data may come from reservoir simulators, sensors, or other measuring tools, as described above with respect to FIGS. 1 and 2. The field data may be empirical data, test data, historical data, real-time data, and/or any other suitable type of data. Examples of the field data include, but are not limited to, well log data, drilling-related well data, well test data, core test data, seismic data, interpretation data, regional geology information, satellite data, and output from a one-dimensional (1D) mechanical earth models (MEM) and/or a three-dimensional (3D) MEM. In one or more embodiments, a MEM is a numerical representation of the state of stress and rock mechanical properties for a specific stratigraphic section in a field or basin. A MEM may integrate seismic data with a numerical representation of a state of stress, a lithography, porosity, fluid content, and mechanical properties of rock strata penetrated during drilling in the subterranean formation. A MEM may provide the geomechanical information required by engineering software used for casing point selection, optimizing the number of casing strings, drilling stable wellbores, designing completions, performing fracture stimulation, and other performing other field operations.

In element 304, a structural model of the field is constructed using the field data. In one or more embodiments, the structural model is used to mathematically model (e.g., using a simulation system) geological bodies within a subterranean formation. The structural model of the field may be in two dimensions or in three dimensions. Modeling of subsurface structures may assist in the search for and extraction of underground resources. For example, flow behavior, connected volume, and overall performance of hydrocarbon reservoirs may all be highly dependent on the petrophysical properties of geological bodies. Some or all of the field data may be used to construct the structural model. The structural model may represent an entire field or a portion of a field.

In element 306, a determination is made as to whether the structural model is valid. If the structural model is not valid, then the process reverts to element 304, where the structural model is recalculated. If the structural model is valid, then the process proceeds to element 308. In one or more embodiments, the structural model is validated by comparing the amount of rock before deformation with the amount of rock after deformation. Deformation of a subterranean formation may be derived from geological events such as folding, faulting, differential compaction, uplift, and subsidence. Geological factors, such as erosion, may be considered in validating the structural model.

In element 308, the geological layers of the valid structural model are restored. In one or more embodiments, the geological layers are identified by geological age, such as from youngest to oldest. The youngest geological layer in a subterranean formation may be the geological layer that is closest to the surface. Likewise, the oldest geological layer in a subterranean formation may be the geological layer that is furthest away from the surface. The number of geological layers in a subterranean formation may depend on a number of factors, including but not limited to the age of the formation and the depth of interest within the field.

Continuing with element 308, restoring the geological layers may include choosing an algorithm that corresponds to the structural regime of the subterranean formation, including but not limited to unfolding without considering faults in the formation, inclined shear, flextural slip, fault parallel flow, and trishear when considering faults. In one or more embodiments, restoring the geological layers results in a series of structural models in different geological times throughout a geological history. The structural restoration of each geological layer may generate one or more boundary conditions to define the finite boundaries of the geological layer. Boundary conditions may include, but are not limited to, one or more depths, a set of coordinates, an area, a volume, some other definition of a subterranean area or space, or any suitable combination thereof.

In element 310, the geological layers are forward modeled using geomechanical properties and boundary conditions obtained from the structural restoration of each geological layer to determine fractures resulting from internal stress and internal strain for each geological layer. In this case, geomechanical properties may be obtained from mechanical earth models. In one or more embodiments, because each geological layer is considered as a volume, the geomechanical forward modeling process is performed non-linearly. During the forward modeling, a determination of the magnitude and/or orientation of stresses and/or strains in a geological layer based on the geomechanical properties may be used to determine one or more fractures in the geological layer. Forward modeling a geological layer may also include re-determining fractures of geological layers that were previously forward modeled (e.g., older geological layers). Details of one or more embodiments of element 310 are described below with respect to FIG. 4.

In element 312, fractures in the field are determined using the results of the geomechanical forward modeling and geostatistical modeling. In one or more embodiments, fracture patterns in one or more geological layers are developed based on the origin of a fracture and the subsequent structural events. The magnitude of each of the stresses obtained previously may be used to determine whether the fracture intensity is constrained. The orientation of each of the stresses obtained previously may be used to determine the fracture orientation is constrained. A fracture formed in an earlier geological time may be reactivated by a subsequent structural event.

In element 314, a 3D volume of the field showing the fractures is constructed. In one or more embodiments, the 3D volume is a three-dimensional representation of the field. Because the volume is in three dimensions, the magnitude and/or orientation of the fractures in the field may be described. The 3D volume of the field may be data in a useable format, including but not limited to a database, a spreadsheet, a graph, and/or any other suitable format. The 3D volume may also be shown on a display or as some other suitable visual output. In one or more embodiments, the 3D volume includes plastic tensile strain distributions.

In element 316, a field operation of the field is performed using the 3D volume. In one or more embodiments, the field operation is determined based on, for example, output of a model simulation of the field using the 3D volume. The field operation may be to explore a new section of the field, to develop an existing section of the field, to extract a resource from the field, or to perform some other operation in the field.

Turning to FIG. 4, FIG. 4 describes detail, in one or more embodiments, describing the forward modeling of geological layers using geomechanical properties to determine fractures resulting from internal stress and internal strain for each geological layer. In element 402, the oldest geological layer is forward modeled using geomechanical properties (i.e., geomechanical forward modeling). The oldest geological layer may be the geological layer of the subterranean formation that is currently furthest from the surface. In other words, the oldest geological layer may originate at the earliest geological time of the geological layers being processed. Geomechanical properties may include, but are not limited to, cohesion, tensile cut-off, Young's modulus, Poisson's ration, and bulk density.

In element 404, one or more fractures in the oldest geological layer are determined based on an internal stress and an internal strain in the oldest layer found when forward modeling the oldest geological layer. In one or more embodiments, forward modeling geological layers includes determining a magnitude and/or orientation of internal stresses and/or internal strains induced by one or more structural events (e.g., the development of additional geological layers). The internal stresses and internal strains of the oldest geological layer may be determined, at least in part, using gravity loading on top of the geological layer and/or displacement loading on the bottom of the geological layer. In one or more embodiments, gravity loading may be determined using densities from log data from one or more sources, including but not limited to a logging tool, a 1D MEM, and a 3D MEM. Displacement loading may be differential displacement applied to the base of the geological layer in the geomechanical forward model.

In element 406, a next geological layer is forward modeled using geomechanical properties (i.e., geomechanical forward modeling). The next geological layer may be determined based on the order of the geological layers in geological time. Geomechanical properties may be the same as those discussed above with respect to element 402.

In element 408, one or more fractures in the next geological layer are determined based on an internal stress and an internal strain in the next geological layer found when forward modeling the next geological layer. In one or more embodiments, forward modeling the next geological layer includes determining a magnitude and/or orientation of internal stresses and/or internal strains induced by one or more structural events (e.g., the development of additional geological layers). The internal stresses and internal strains of the next geological layer may be determined, at least in part, using gravity loading on top of the next geological layer and/or displacement loading on the bottom of the next geological layer. In one or more embodiments, gravity loading may be determined using densities from log data from one or more sources, including but not limited to a logging tool, a 1D MEM, and a 3D MEM. Displacement loading may be differential displacement applied to the base of the next geological layer by the previous geological layers in the geomechanical forward model.

In element 410, one or more fractures in each previous geological layer are redetermined based on the effect of the next geological layer on the internal stress and internal strain of each previous geological layer. In one or more embodiments, a next geological layer may cause all or a portion of one or more previous geological layers to develop new fractures and/or alter existing fractures. The geomechanical forward modeling may be adapted to account for the effect of the next geological layer on each of the older geological layers to assist in redetermining the fractures in each of the older geological layers.

In element 412, a determination is made as to whether there are more geological layers. A user may choose to analyze a field using all geological layers. Alternatively, a user may choose to analyze a field using a subset of all geological layers. The subset of geological layers of a field may be consecutive in geological age. If there are more geological layers, then the process reverts to element 406. If there are no more geological layers, then the process ends.

The following describe examples in accordance with one or more embodiments. The example is for explanatory purposes only and is not intended to limit the scope of using forward modeling to determine fractures in a field. Terminology used in FIGS. 1 and 2 may be used in the examples without further reference to FIGS. 1 and 2.

EXAMPLE 1

Figure 5:
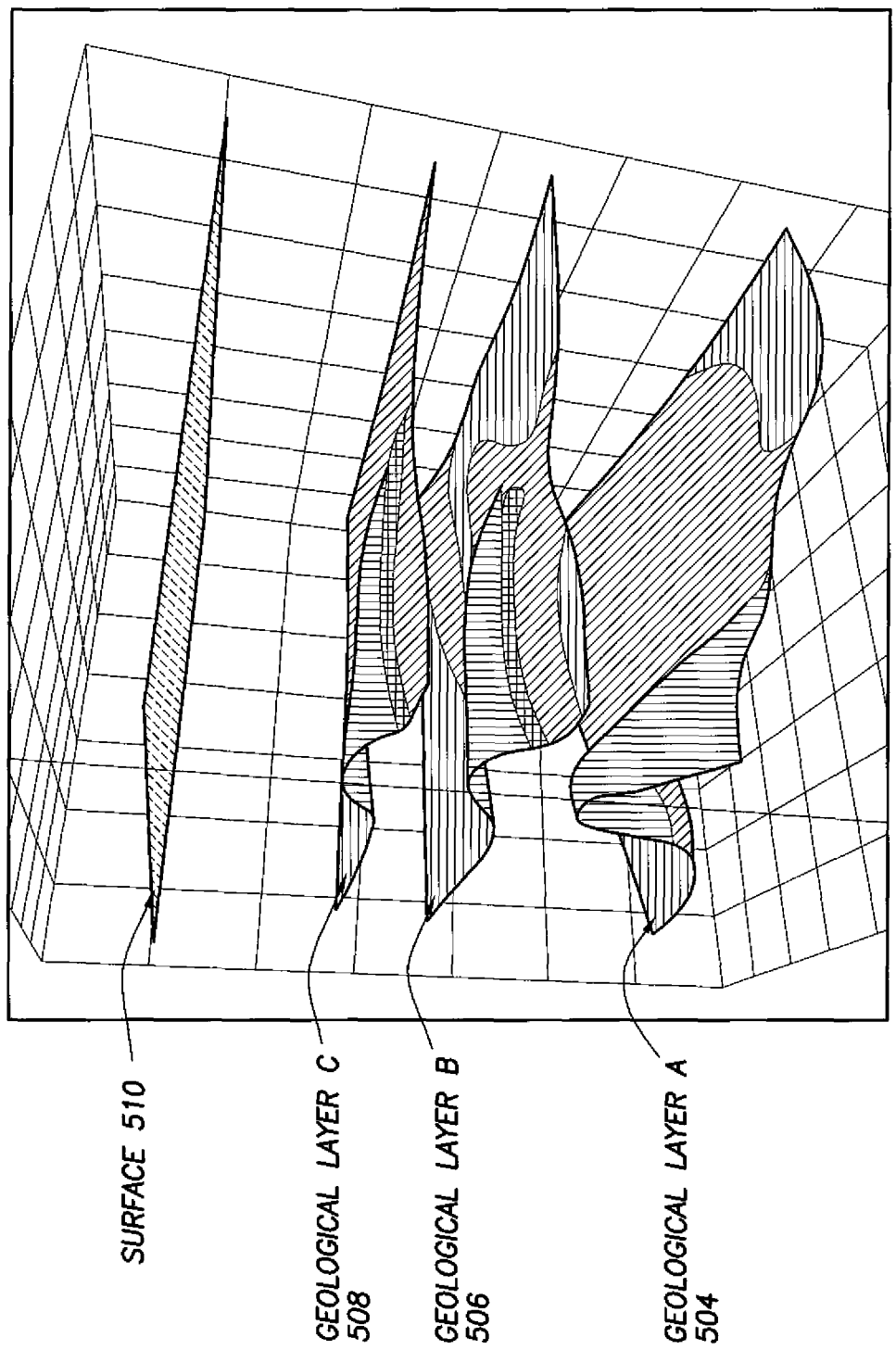
FIGS. 5-8 each illustrate an example display for determining field fractures using geomechanical forward modeling in accordance with one or more embodiments.

Consider the following example that describes determining field fractures using geomechanical forward modeling in accordance with one or more embodiments described above. FIG. 5 shows a three-dimensional structural model of a field including a plurality of geological layers. In one or more embodiments, the three-dimensional structural model of the field is a paleo-spastic model, which depicts a geological object at the time of deposition. In this case, the structural model has already been validated. The structural model may have been created and validated using field data collected from any number of sources, as well as any of a number of software programs or other subterranean formation model technologies known in the art. The structural model in FIG. 5 shows three geological layers (i.e., geological layer A 504, geological layer B 506, geological layer C 508) of the field under the surface 510. Geological layer A 504, geological layer B 506, and geological layer C 508 may be consecutive geological layers in the subterranean formation, or other geological layers, not shown in FIG. 5, may exist between geological layer A 504, geological layer B 506, and/or geological layer C 508.

Geological layer A 504 is the oldest shown geological layer in the field because geological layer A 504 is the furthest geological layer from the surface 510. Geological layer B 506 is the second oldest shown geological layer in the field because geological layer B 506 is the second furthest geological layer from the surface 510. Geological layer C 508 is the youngest shown geological layer in the field because geological layer C 508 is the closest geological layer to the surface 510. When restoring the geological layers from the structural model, the newest geological layer (i.e., geological layer C 508) may be restored initially, followed by the next youngest geological layer (i.e., geological layer B 506) and so on.

Figure 6:
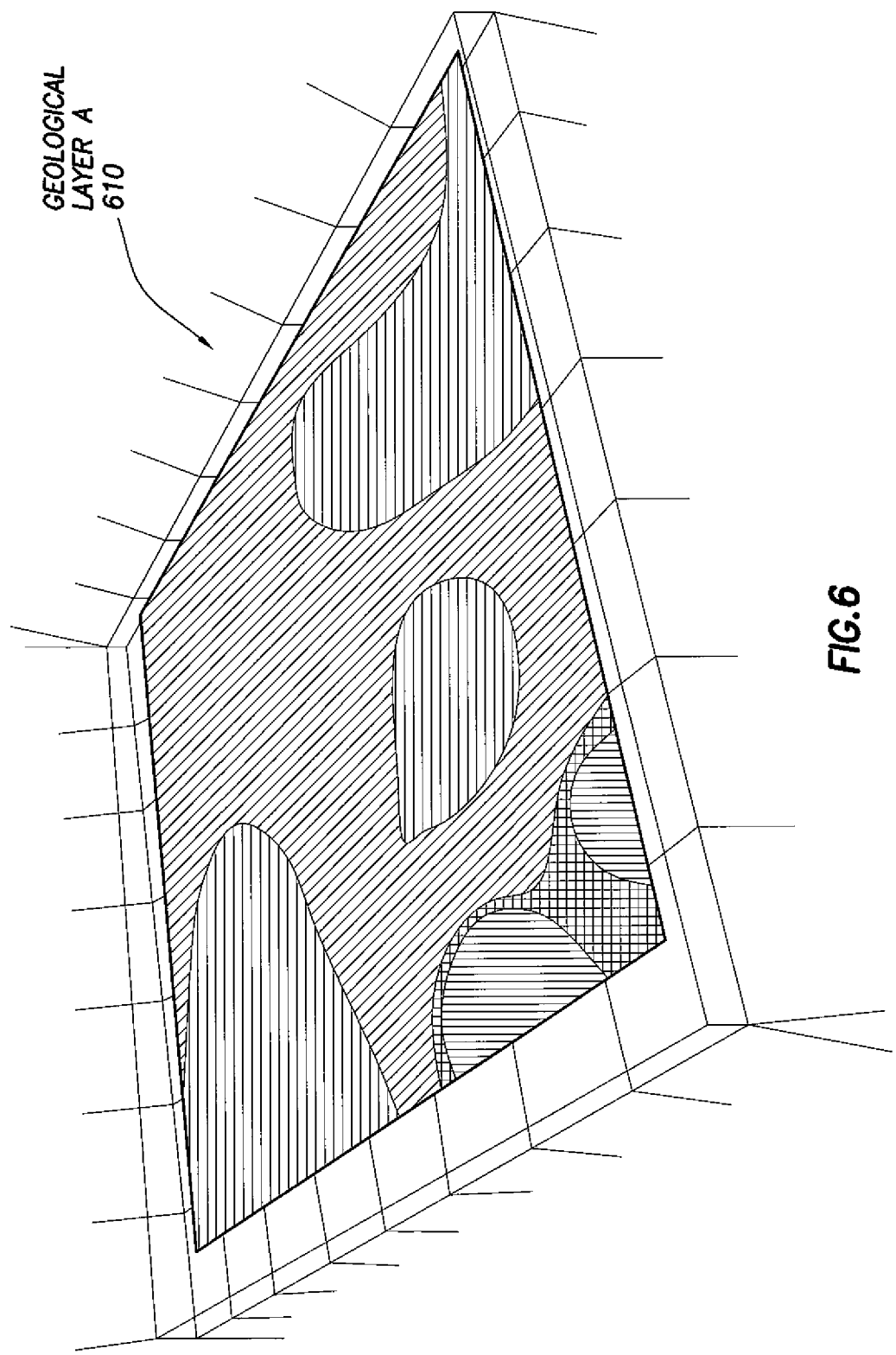

FIG. 6 shows geological layer A 610, which is a reconstruction of geological layer A 504 in FIG. 5, the oldest geological layer in the subterranean formation. As can be seen, geological layer A 610 contains significantly fewer undulations compared to geological layer A 504 in FIG. 5. In one or more embodiments, the extent of various undulations in geological layer A 610 are depicted by color coding, hatching, or some other way of designating relative elevation within each part of geological layer A 610. In this example in FIG. 6, the undulations within geological layer A 610 are shown by hatching.

Once the geological layers of the subterranean formation in the field (e.g., geological layer A 504, geological layer B 506, geological layer C 508 from FIG. 5) are restored, then the forward modeling of each of the geological layers may begin. In one or more embodiments, the oldest geological layer is the first to be reconstructed, followed by the next oldest, and so on. Each geological layer is reconstructed using geomechanical forward modeling, as described above.

Figure 7:
Figure 7:
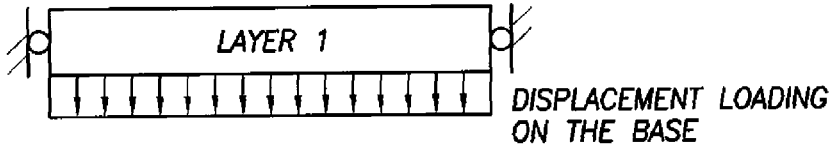
Figure 7:
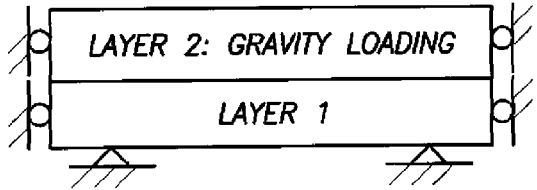
Figure 7:
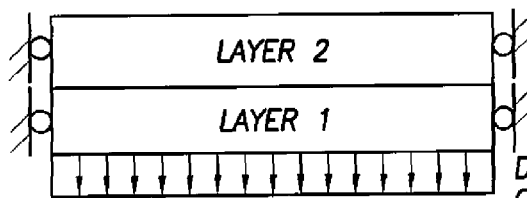
Figure 7:
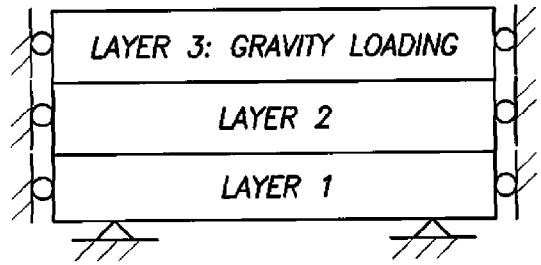
Figure 7:
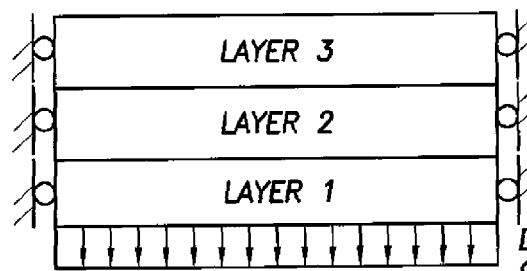

A graphical depiction of the geomechanical forward modeling process is shown in FIG. 7. At 702, the oldest geological layer (i.e., layer 1, corresponding to geological layer 506 from FIG. 5) begins to form and the effects of gravity are considered based on geomechanical properties of layer 1 as layer 1 is formed. The geomechanical properties may be obtained from a number of sources, including but not limited to a 1D MEM and a 3D MEM. For example, densities based on log data from the 1D MEM may be used to determine the gravity loading in 702. In one or more embodiments, because each geological layer is considered as a volume, the geomechanical forward modeling process may be performed non-linearly when determine the affect of the gravity loading in 3D space. Once layer 1 is formed at 702, then the effects of displacement loading, determined based on the geomechanical properties, are considered at 704. In one or more embodiments, the displacement loading at 704 is a set of differential displacement loads, obtained from the structural restoration of layer 1 in 702, applied to the base of layer 1. In one or more embodiments, because each geological layer is considered in terms of volume, the geomechanical forward modeling process may be performed non-linearly to determine the set of differential displacement loads in 3D space.

The combination of these two modeling processes (i.e., 702 and 704) determines internal stresses and internal strains on the geological layer. The two modeling processes (i.e., 702 and 704) described in forward modeling layer 1 may be incorporated as one single modeling process or as two separate processes. In one or more embodiments, the forward modeling of each geological layer may be performed using a paleo-spastic reconstruction as described above with respect to FIGS. 5-6, which derives strain boundary conditions of layer 1. The strain boundary conditions of layer 1 may be used to determine internal stress state and internal strain energy within and applied to layer 1. In one or more embodiments, the internal stress state and the internal strain energy manifest themselves within layer 1 as elastoplastic strain and/or the creation and/or propagation of faults and fractures (e.g., in the form of high shear bands). The elastoplastic strain and/or faults/fractures may include magnitude and orientation within layer 1.

At 706, the second oldest geological layer (i.e., layer 2, corresponding to geological layer 508 from FIG. 5) is forward modeled and the effects of gravity are considered based on the geomechanical properties of layer 2. The geomechanical forward modeling for layer 2 in 706 is substantially similar to the geomechanical forward modeling for layer 1 described above with respect to 702. In addition, the geomechanical forward modeling for layer 1 is re-performed, adding the effect of layer 2 on the gravity loading of layer 1. Once layer 2 is formed at 706, then the effects of displacement loading, determined based on geomechanical properties, are considered at 708. In one or more embodiments, the displacement loading at 708 is a set of differential displacement loads, obtained from the structural restoration of layer 2 in 706, applied by layer 2 through layer 1 to the base of the model.

As the geomechanical forward model is re-performed for layer 1, new internal stresses and internal strains and/or changes to previously-determined stresses and internal strains, may be determined in layer 1. As a result, new and/or different elastoplastic strains and/or fractures/faults for layer 1 may be determined when the geomechanical forward model is re-performed for layer 1. The revised elastoplastic strain and/or revised faults/fractures may include revised magnitude and revised orientation within layer 1.

At 710, the third oldest geological layer (i.e., layer 3, corresponding to geological layer 510 from FIG. 5) is forward modeled and the effects of gravity are considered in conjunction with geomechanical properties of layer 3. The geomechanical forward modeling for layer 3 in 710 is substantially similar to the geomechanical forward modeling for layer 1 and layer 2, described above with regard 702-704 and 706-708, respectively. In addition, the geomechanical forward modeling for layers 1 and 2 are re-performed, adding the effect of layer 3 on the gravity loading of layers 1 and 2. Once layer 3 is formed at 710, then the effects of displacement loading, determined based on the geomechanical properties, are considered at 712. In one or more embodiments, the displacement loading at 712 is a set of differential displacement loads, resulting from the structural restoration of layer 3 in 710, applied by layer 3 through layers 1 and 2 to the base of the model.

As the geomechanical forward model is re-performed for layers 1 and 2, new internal stresses and internal strains and/or changes to previously-determined stresses and internal strains, may be determined in layers 1 and 2. As a result, new and/or different elastoplastic strains and/or fractures/faults for layers 1 and 2 may be determined when the geomechanical forward model is re-performed for layers 1 and 2. The revised elastoplastic strain and/or revised faults/fractures may include revised magnitude and revised orientation within layers 1 and 2.

Once the geomechanical forward model has been run for each geological layer (and re-performed for previously-considered geological layers as each new geological layer is reconstructed), the results of the geomechanical forward model of the field are used in a geostatistical model to determine orientation and magnitude of fractures in the subterranean formation. A three-dimensional model of the field, showing the fractures, may then be constructed and used to perform a field operation.

EXAMPLE 2

Figure 8:
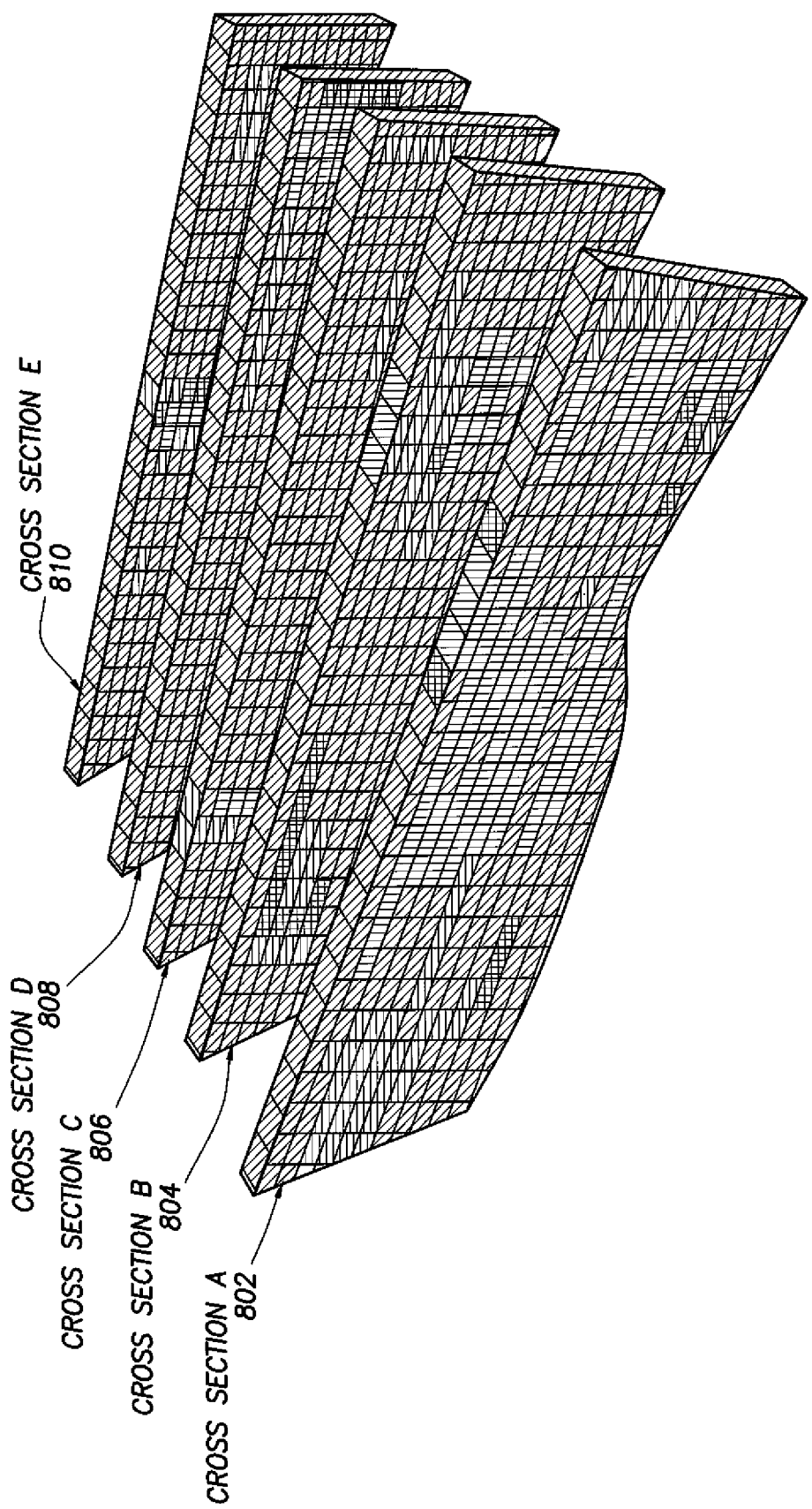

Consider the following example that describes determining field fractures using geomechanical forward modeling in accordance with one or more embodiments described above. FIG. 8 shows a series of two-dimensional cross sections (e.g., cross section A 802, cross section B 804, cross section C 806, cross section D 808, and cross section E 810) of a field. In one or more embodiments, each cross section (e.g., cross section A 802, cross section B 804, cross section C 806, cross section D 808, and cross section E 810) is a vertical cross section of the field, and so each cross section (e.g., cross section A 802, cross section B 804, cross section C 806, cross section D 808, and cross section E 810) includes all geological layers of the field. In this case, the structural model that produced the series of two-dimensional cross sections (e.g., cross section A 802, cross section B 804, cross section C 806, cross section D 808, and cross section E 810) has already been validated. The structural model may have been created and validated using filed data collected from any number of sources, as well as any of a number of software programs or other subterranean formation model technologies known in the art.

The process in working with the two-dimensional cross sections (e.g., cross section A 802, cross section B 804, cross section C 806, cross section D 808, and cross section E 810) is substantially similar to that described above in Example 1 for a three-dimensional structural model. Each two-dimensional cross section (e.g., cross section A 802, cross section B 804, cross section C 806, cross section D 808, and cross section E 810) is restored to establish a number of geological layers. Once the geological layers for each two-dimensional cross section (e.g., cross section A 802, cross section B 804, cross section C 806, cross section D 808, and cross section E 810) are established, then each two-dimensional cross section (e.g., cross section A 802, cross section B 804, cross section C 806, cross section D 808, and cross section E 810) is forward modeled incrementally by each geological layer using geomechanical properties. Once each two-dimensional cross section (e.g., cross section A 802, cross section B 804, cross section C 806, cross section D 808, and cross section E 810) has been forward modeled, and the internal stresses and internal strains of each layer within each two-dimensional cross section (e.g., cross section A 802, cross section B 804, cross section C 806, cross section D 808, and cross section E 810) have been determined, then the results of the geomechanical forward modeling for each two-dimensional cross section (e.g., cross section A 802, cross section B 804, cross section C 806, cross section D 808, and cross section E 810) are used in a geostatistical model to create a three-dimensional volume of the field showing the magnitude and orientation of the fractures in the field. A field operation may then be performed using the 3D volume.

In one or more embodiments, using geomechanical forward modeling to determine field fractures allows for accurate determination of the magnitude and orientation of fractures in a field. Using fracture models that accurately describe the magnitude and orientation of fractures in a field may allow for field operations to be performed more effectively, saving time, money, and other resources. In one or more embodiments, one or more field operations are performed based on an accurate 3D model of the field produced by geomechanical forward modeling.

Figure 9:
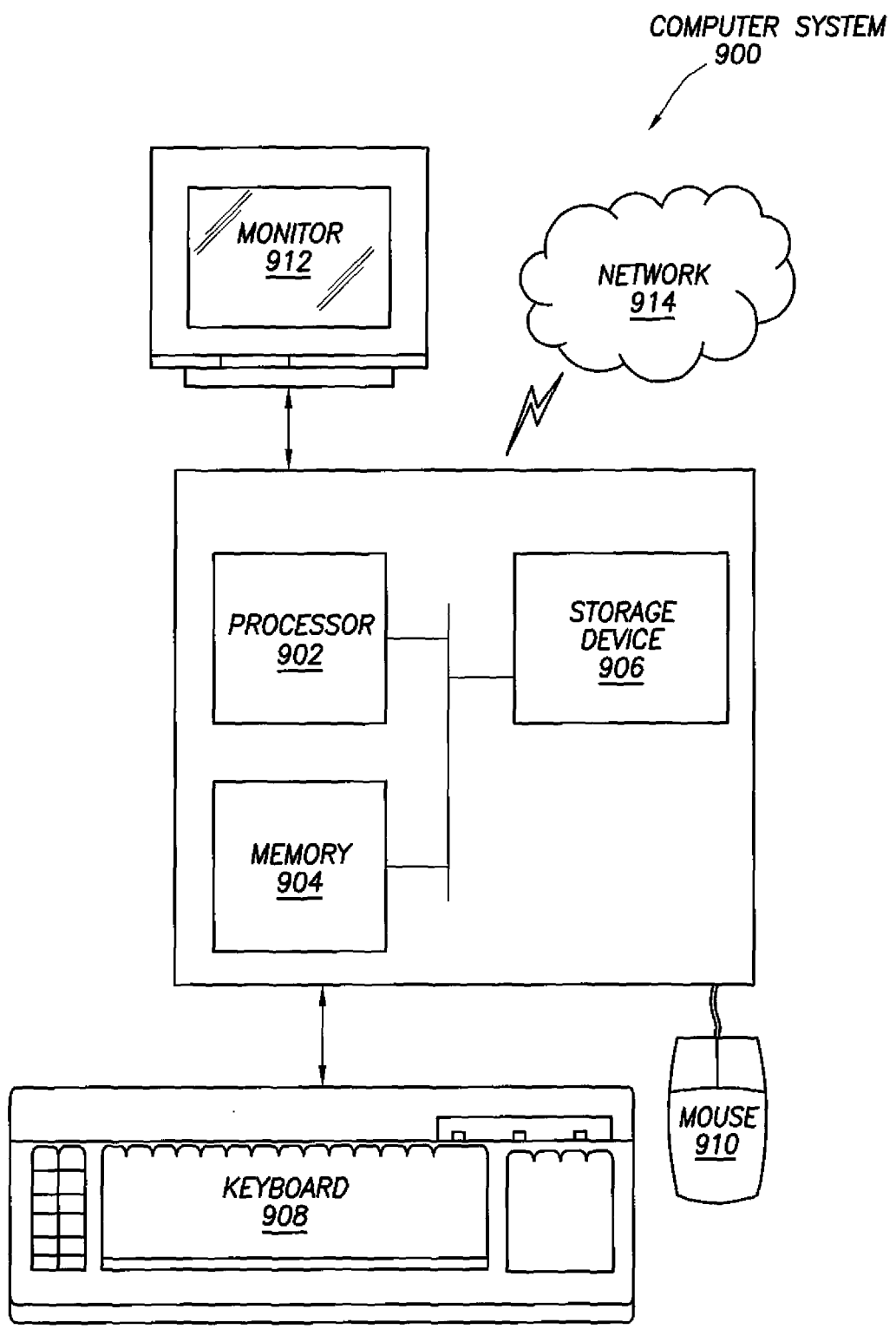
FIG. 9 illustrates an example computer system in which embodiments of determining field fractures using geomechanical forward modeling may be implemented.

Embodiments of determining field fractures using geomechanical forward modeling may be implemented on virtually any type of computer regardless of the platform being used. For example, as shown in FIG. 9, a computer system (900) includes one or more processor(s) (902), associated memory (904) (e.g., random access memory (RAM), cache memory, flash memory, etc.), a storage device (906) (e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). The computer system (900) may be connected to a network (914) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (900) includes at least the minimal processing, input, and/or output means necessary to practice embodiments of determining field fractures using geomechanical forward modeling.

Further, those skilled in the art will appreciate that one or more elements of the aforementioned computer system (900) may be located at a remote location and connected to the other elements over a network. Further, embodiments of determining field fractures using geomechanical forward modeling may be implemented on a distributed system having a plurality of nodes, where each portion (e.g., data compression module, data decompression module) may be located on a different node within the distributed system. In one embodiment, the node corresponds to a computer system. Alternatively, the node may correspond to a processor with associated physical memory. The node may alternatively correspond to a processor with shared memory and/or resources. Further, software instructions to perform embodiments may be stored on a computer readable medium such as a compact disc (CD), a diskette, a tape, or any other physical computer readable storage device.

While determining field fractures using geomechanical forward modeling has been described with respect to a limited number of embodiments, those skilled in the art, having benefit of this disclosure, will appreciate that other embodiments can be devised which do not depart from the scope of determining field fractures using geomechanical forward modeling as disclosed herein. Accordingly, the scope of determining field fractures using geomechanical forward modeling should be limited only by the attached claims.

What is claimed is:

1. A method for fracture modeling of a field, the method comprising:
   receiving, using a central processing unit (CPU), a structural model of the field, the structural model comprising field data;
   restoring, using the CPU, each of a plurality of geological layers from the structural model to create a plurality of boundary conditions;
   processing each of the plurality of geological layers by iteratively forward modeling each of the plurality of geological layers, defined by one of the plurality of boundary conditions, using geomechanical properties by:
      determining, using the CPU, fractures resulting from an internal stress and an internal strain determined based on the geomechanical properties of the each of the plurality of geological layers; and
      redetermining, using the CPU, the fractures resulting from the internal stress and the internal strain for each previously processed geological layer of the plurality of geological layers using the geomechanical properties;
   when each of the plurality of geological layers is forward modeled, generating, using the CPU and geostatistical modeling, a fracture model with the fractures resulting from the internal stress and the internal strain of the plurality of geological layers; and
   presenting, using the CPU, the fracture model for use in planning a field operation.

2. The method of claim 1, further comprising:
   validating the structural model prior to restoring the plurality of geological layers from the structural model.

3. The method of claim 1, further comprising:
   constructing a 3D volume of the field comprising the fractures before performing the field operation.

4. The method of claim 1, wherein each of the plurality of geological layers is reconstructed in order of geological time.

5. The method of claim 1, wherein the structural model comprises a plurality of two-dimensional cross sections of the field.

6. The method of claim 5, wherein each of the plurality of two-dimensional cross sections of the field is restored into the plurality of geological layers.

7. The method of claim 1, wherein the internal stress and the internal strain are determined using a gravity load and a displacement load, where the gravity load and the displacement load are determined based on the geomechanical properties.

8. The method of claim 7, wherein the geomechanical properties are densities obtained from a 1D mechanical earth model.

9. A non-transitory computer readable storage medium storing instructions for fracture modeling of a field, the instructions when executed causing a central processing unit (CPU) to:
   receive a structural model of the field, the structural model comprising field data;
   restore each of a plurality of geological layers from the structural model to create a plurality of boundary conditions;
   process each of the plurality of geological layers by iteratively forward model each of the plurality of geological layers, defined by one of the plurality of boundary conditions, using geomechanical properties by:
      determine fractures resulting from an internal stress and an internal strain determined based on the geomechanical properties of the each of the plurality of geological layers;
      redetermine the fractures resulting from the internal stress and the internal strain for each previously processed geological layer of the plurality of geological layers using the geomechanical properties;
   when each of the plurality of geological layers is forward modeled, generate, using geostatistical modeling, a fracture model with the fractures resulting from the internal stress and the internal strain of the plurality of geological layers; and
   present the fracture model for use in planning a field operation.

10. The computer readable medium of claim 9, wherein the instructions when executed further cause the CPU to:
   validate the structural model prior to restoring the plurality of geological layers from the structural model.

11. The computer readable medium of claim 9, wherein the instructions when executed further cause the CPU to:
   construct a 3D volume of the field comprising the fractures before performing the field operation.

12. The computer readable medium of claim 9, wherein the internal stress and the internal strain are determined using a gravity load and a displacement load, where the gravity load and the displacement load are determined based on the geomechanical properties.

13. The computer readable medium of claim 12, wherein the geomechanical properties are densities obtained from a 1D mechanical earth model.

14. A system for determining fracture in a field, the system comprising:
   memory;
   an application interface executing on a central processing unit (CPU) and configured to receive a structural model of the field from a structural model module;
   a layer restoration module executing on the CPU and configured to:

receive the structural model from the application interface;

restore the structural model into a plurality of geological layers; and define a plurality of boundary conditions for the plurality of geological layers;

a geomechanical forward modeling module executing on the CPU and configured to:

process each of the plurality of geological layers by iteratively forward model each of the plurality of geological layers, defined by one of the plurality of boundary conditions, using geomechanical properties;

determine fractures resulting from an internal stress and an internal strain found when forward modeling one of the plurality of layers; and when forward modeling each of the plurality of layers, redetermine the fractures resulting from the internal stress and the internal strain for each previously processed layer of the plurality of geological layers using the geomechanical properties;

a geostatistical model module executing on the CPU and configured to generate a model with the fractures based on the internal stress and the internal strain of the plurality of geological layers, the model with the fractures being sent to a field model module using the application interface to plan a field operation.

15. The system of claim 14, further comprising:
a validation module executing on the CPU and configured to validate the structural model received from the structural model module.

16. The system of claim 14, further comprising:
a user component configured to provide input to the geomechanical forward modeling module using the application interface.

17. The system of claim 14, further comprising:
a security module executing on the CPU and configured to provide secure access to the geomechanical forward modeling module and the geostatistical model module.

18. The system of claim 14, wherein the structural model module generates a plurality of two-dimensional cross sections of the field.

19. The system of claim 18, wherein the layer restoration module restores each of the plurality of two-dimensional cross sections of the field into the plurality of geological layers.

20. The system of claim 14, wherein the model generated by the geostatistical model module is a three-dimensional model.

* * * * *